United States Patent
Hou et al.

(10) Patent No.: US 8,648,968 B2
(45) Date of Patent: Feb. 11, 2014

(54) SATURATION ADJUSTING APPARATUS AND METHOD THEREOF

(75) Inventors: Li-Cong Hou, Suzhou Industrial Park (CN); Dong-Yu He, Suzhou Industrial Park (CN); Hong-Hai Dai, Suzhou Industrial Park (CN)

(73) Assignee: Realtek Semiconductor Corp., Hsinchu (TW)

( * ) Notice: Subject to any disclaimer, the term of this patent is extended or adjusted under 35 U.S.C. 154(b) by 24 days.

(21) Appl. No.: 13/194,265

(22) Filed: Jul. 29, 2011

(65) Prior Publication Data

US 2012/0026404 A1 Feb. 2, 2012

(30) Foreign Application Priority Data

Aug. 2, 2010 (TW) ................................. 99125589 A

(51) Int. Cl.
*H04N 5/46* (2006.01)

(52) U.S. Cl.
USPC .......................................................... 348/645

(58) Field of Classification Search
USPC ................. 348/645, 646, 649, 650, 651, 673; 345/589, 592, 690, 698; 382/167, 194, 382/274
See application file for complete search history.

(56) References Cited

U.S. PATENT DOCUMENTS

| 7,042,521 | B2 * | 5/2006 | Kim | 348/645 |
|---|---|---|---|---|
| 7,064,768 | B1 * | 6/2006 | Bao | 345/589 |
| 7,242,800 | B2 * | 7/2007 | Iguchi et al. | 382/167 |
| 7,277,576 | B2 * | 10/2007 | Abbate | 382/167 |
| 2008/0055478 | A1 * | 3/2008 | Jaspers | 348/645 |
| 2009/0009779 | A1 * | 1/2009 | Do | 358/1.9 |
| 2010/0085487 | A1 * | 4/2010 | Sarkar et al. | 348/649 |
| 2010/0100813 | A1 * | 4/2010 | Saito et al. | 715/255 |
| 2010/0160044 | A1 * | 6/2010 | Satoh et al. | 463/35 |

FOREIGN PATENT DOCUMENTS

TW 201003568 A 1/2010

OTHER PUBLICATIONS

English Abstract translation of TW201003568 (Published Jan. 16, 2010).

* cited by examiner

*Primary Examiner* — Paulos M Natnael
(74) *Attorney, Agent, or Firm* — McClure, Qualey & Rodack, LLP

(57) ABSTRACT

A saturation adjusting apparatus for processing a pixel, which has three color components each having a value falling within a range defined by upper and lower extreme values, of a RGB color model includes an extreme value controller and a component adjuster. The extreme value controller determines maximum and minimum extreme value thresholds for ensuring that the values of the color components of the pixel after undergoing linear color correction processing based on a correction indicator fall within the range defined by the upper and lower extreme values. The component adjuster includes a decision-making unit for choosing the correction indicator from a group of values which includes the maximum extreme value threshold, the minimum extreme value threshold, and a saturation setting. The component adjuster further includes a color corrector for performing linear color correction processing on the three color components of the pixel using the correction indicator.

19 Claims, 3 Drawing Sheets

SATURATION ADJUSTING APPARATUS AND METHOD THEREOF

CROSS-REFERENCE TO RELATED APPLICATION

This application claims priority of Taiwanese Application No. 099125589, filed on Aug. 2, 2010.

BACKGROUND

1. Technical Field

The disclosure relates to a color correction technique.

2. Description of the Related Art

In chromatology, different kinds of coordinate models are available for analysis of images. For example, a HSI color model is described using three coordinate components: hue, saturation, and intensity. Since the saturation component is a separate component in the HSI color model, a saturation degree of an image may be adjusted directly for achieving a desired color effect.

However, a RGB color model currently adopted as an image storage format needs to be transformed into the HSI color model through a nonlinear transformation process for saturation adjustment. Moreover, after the saturation adjustment, the image of the HSI color model further needs to be nonlinearly inverse-transformed back into the RGB color model. The aforementioned nonlinear transformation processes are relatively complicated and require high circuit costs for implementation.

For reducing calculations, another conventional technique for saturation adjusting involves processing an image of a YCbCr color model that is another commonly used image storage format and that may be linearly transformed into the RGB color model using matrix operations. The YCbCr color model is described using three coordinate components: luma Y, first chroma Cb, and second chroma Cr. Since the first and second chromas Cb, Cr affect a saturation degree of the image, the first and second chromas Cb, Cr are scaled by multiplying with a scaling factor (sy) for adjusting the saturation degree of the image.

Nevertheless, the luma Y in the YCbCr model is not capable of adequately representing an intensity degree of the image, such that the first and second chromas Cb, Cr also contain part of the intensity degree of the image. Thus, when the first and second chromas Cb, Cr are scaled-up for increasing the saturation degree, the intensity degree is also increased simultaneously, so that the image becomes blurry because of over brightness in details. Furthermore, a hue degree of the image deviates because the first and second chromes Cb, Cr in the YCbCr model have a nonlinear transformation relation with the hue component in the HSI model. Thus, the image may not maintain the original hue degree by merely scaling the first and second chromas Cb, Cr.

BRIEF SUMMARY

Therefore, a first object of the disclosure is to provide a saturation adjusting apparatus and a method thereof capable of overcoming the aforesaid drawbacks of the prior art.

A second object of the disclosure is to provide a saturation adjusting apparatus and a method thereof capable of protecting image details.

A third object of the disclosure is to provide a saturation adjusting apparatus and a method thereof capable of controlling deviation in hue degree effectively.

A fourth object of the disclosure is to provide a saturation adjusting apparatus and a method thereof capable of saving circuit costs.

BRIEF DESCRIPTION OF THE DRAWINGS

Other features and advantages of the disclosure will become apparent in the following detailed description of the preferred embodiments with reference to the accompanying drawings, of which.

DETAILED DESCRIPTION OF THE EMBODIMENTS

A saturation adjusting apparatus and method thereof of the disclosure are applied directly to a RGB color model for saving circuit costs effectively. The saturation adjusting apparatus and method thereof are capable of adjusting a saturation degree of an image while maintaining an intensity value of the image.

Figure 1:
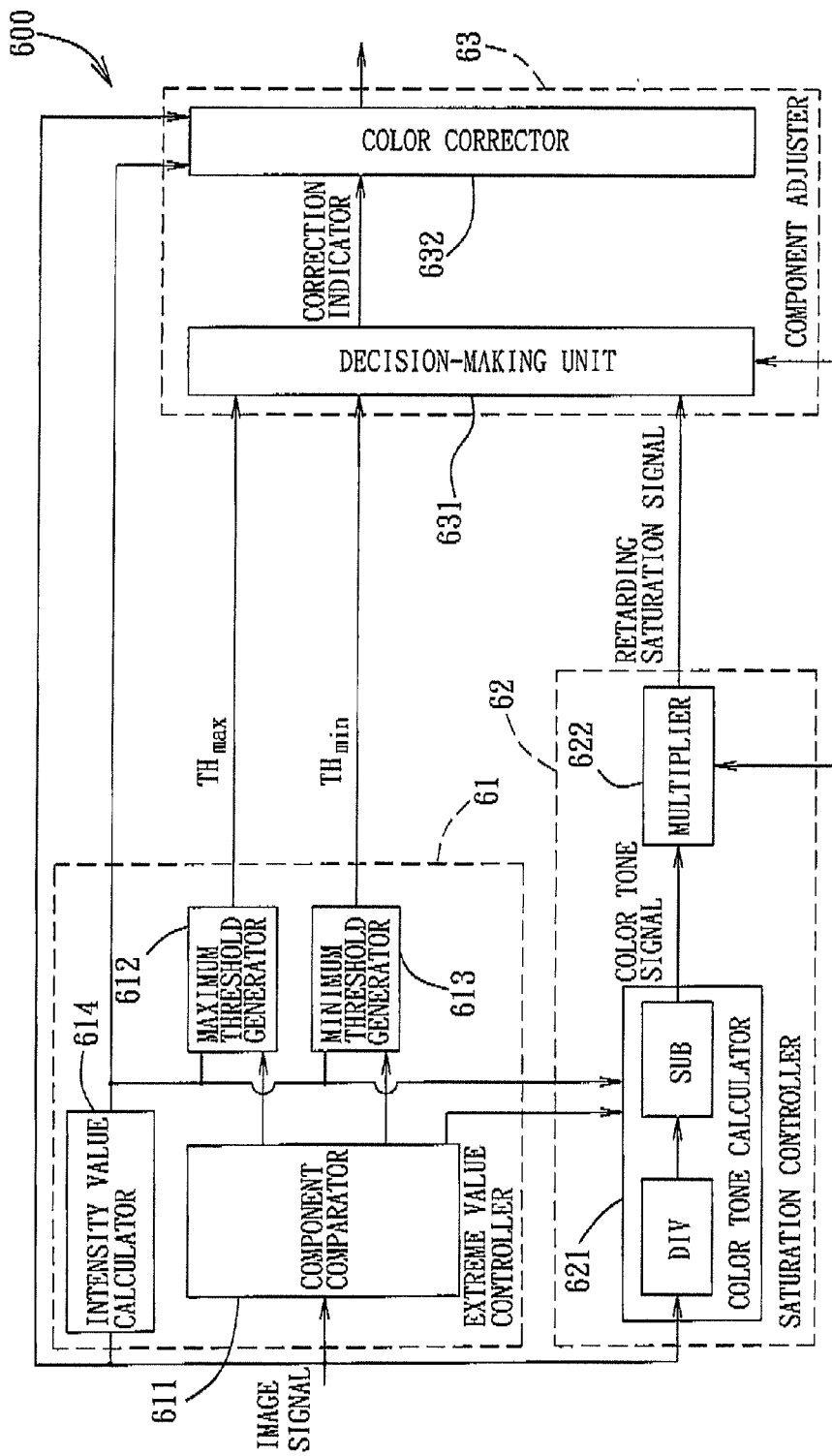
FIG. 1 is a block diagram illustrating an embodiment of the saturation adjusting apparatus of the present invention.

Referring to FIG. 1, an embodiment of the saturation adjusting apparatus 600 of the disclosure is adapted for processing an image signal including a plurality of pixels of the RGB color model, each of the pixels having three color components: r, g, and b. Each of the color components has a value falling within a range defined by upper and lower extreme values, i.e., 255 to 0.

The preferred embodiment of the saturation adjusting apparatus includes an extreme value controller 61, a saturation controller 62, and a component adjuster 63.

The extreme value controller 61 determines a maximum extreme value threshold ($TH_{max}$) and a minimum extreme value threshold ($TH_{min}$) for ensuring that the values of the color components of each of the pixels after undergoing linear color correction processing based on a correction indicator (sa) fall within the range defined by the upper and lower extreme values, i.e., between 255 and 0. The extreme value controller 61 includes an intensity value calculator 614, a component comparator 611, a maximum threshold generator 612, and a minimum threshold generator 613. The intensity value calculator 614 calculates an intensity value I of each pixel equivalent to an average value of the three color components r, g, b thereof according to the following equation:

$$I=(r+g+b)/3.$$

The component comparator 611 chooses one of the color components having a maximum value $P_{max}$ and one of the color components having a minimum value $P_{min}$ from the three color components r, g, b of each pixel. The maximum threshold generator 612 determines the maximum extreme value threshold $TH_{max}$ from the intensity value I obtained by the intensity value calculator 614 and the color component with the maximum value $P_{max}$ chosen by the component comparator 611 such that the values of the color components of each pixel after undergoing the linear color correction processing do not exceed the upper extreme value of 255, according to the following inequality:

$$\therefore P_{max}+(P_{max}-I)\times sa \leq 255$$

$$\therefore sa \leq TH_{max}=(255-P_{max})/(P_{max}-I).$$

Figure 3:
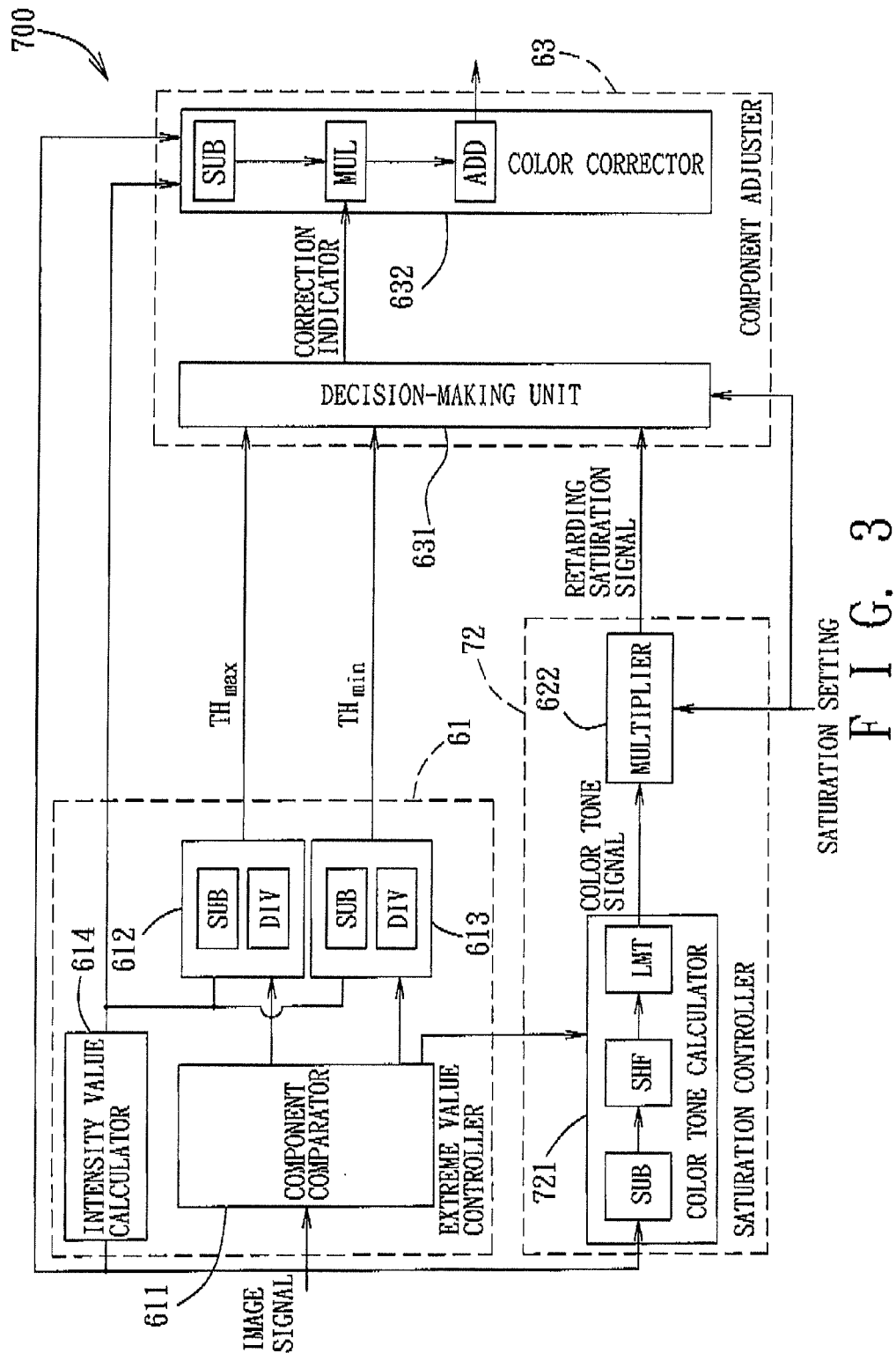
FIG. 3 is a block diagram illustrating another embodiment of the saturation adjusting apparatus of the disclosure.

The minimum threshold generator 613 determines the minimum extreme value threshold $TH_{min}$ from the intensity value I obtained by the intensity value calculator 614 and the color component with the minimum value $P_{min}$ chosen by the component comparator 611 such that the values of the color components of each pixel after undergoing the linear color correction processing are not smaller than the lower extreme value of 0, according to the following inequality:

$$\because P_{min}+(P_{min}-I)\times sa \geq 0$$

$$\therefore sa \leq TH_{min}=P_{min}/(I-P_{min}).$$

in which, since the intensity value I represents the average value of the three color components r, g, b of the pixel and each of the three color components r, g, b falls within a range from 0 to 255, the maximum and minimum extreme value thresholds $TH_{max}$, $TH_{min}$ are both greater than or equal to 0. Moreover, in this embodiment, the maximum and minimum threshold generators 612, 613 are implemented using subtractors SUB and dividers DIV, as best shown in FIG. 3. Only the maximum value $P_{max}$ and the minimum value $P_{min}$ are limited because the greater the color component, the greater an adjusted color component will be, and the smaller the color component, the smaller the adjusted color component will be after undergoing the linear color correction processing. Thus, by ensuring that the adjusted color components corresponding to the maximum value $P_{max}$ and the minimum value $P_{min}$ fall within the range from 255 to 0, the remaining one of the color components will fall within the range from 0 to 255 so that an adjusted pixel may conform with the RGB color model format, while the intensity value I of the adjusted pixel is maintained.

The saturation controller 62 calculates a retarding saturation signal, which is capable of retarding a variation rate of the saturation degree during the color correction processing, for each pixel based on an external saturation setting. Moreover, the image signal may carry images including a plurality of pixels, and the saturation controller 62 processes pixels in the same image by using the same saturation setting. Since the RGB color model and the HSI color model have a nonlinear transformation relation, the saturation degree of the pixel may increase nonlinearly during the color correction processing as the correction indicator (sa) increases, especially when the correction indicator (sa) increases positively. In other words, after undergoing the color correction processing, the adjusted pixel may change from an under-saturated state to an over-saturated state as a result of a slight increase in the correction indicator (sa), such that the effect of an expected saturation degree is hard to achieve. Therefore, the retarding saturation signal is calculated for limiting the correction indicator (sa). The saturation controller 62 includes a color tone calculator 621 and a multiplier 622. The color tone calculator 621 is for calculating a color tone signal that has a value smaller than or equal to 1 and that is indicative of the saturation degree of the pixel according to the values of the three color components r, g, b of the pixel. The multiplier 622 is for multiplying the color tone signal by the saturation setting to obtain the retarding saturation signal. Since the color tone signal is smaller than or equal to 1, the retarding saturation signal may not exceed the saturation setting.

In this embodiment, the color tone signal is the saturation component in the HSI color model. Therefore, according to the following equation:

saturation degree=$1-\min(r,g,b)/I$, the color tone calculator 621 includes a divider for dividing the minimum value $P_{min}$ of the color components of the pixel by the intensity value I of the pixel to obtain a quotient result; and a subtractor for subtracting the quotient result from the divider from a predetermined number to obtain the color tone signal. In this embodiment, the predetermined number is equal to 1.

Another preferred embodiment of the saturation adjusting device 700 of the present invention is illustrated in FIG. 3. This embodiment differs from the previous embodiment in the configuration of the color tone calculator 721 of the saturation controller 72, which calculates the color tone signal capable of representing the saturation degree of the pixel. Referring to FIG. 3, the color tone calculator 721 includes: a subtractor SUB for calculating a difference between the maximum value $P_{max}$ of the color components of the pixel and the minimum value $P_{min}$ of the color components of the pixel to obtain a difference result; a shifter SHF for obtaining a quotient resulting from division of the difference result from the subtractor SUB by a predetermined value (in this embodiment, the predetermined value is equal to 64); and a limiter LMT for setting the color tone signal to be equal to a preset number if the quotient from the shifter SHF is greater than a threshold, and to be equal to the quotient if the quotient from the shifter SHF is not greater than the threshold. In this embodiment, the preset number is equal to 1, and the threshold is equal to 1. The color tone signal represents the saturation degree by using a maximum difference value of the three color components r, g, b.

The component adjuster 63 includes a decision-making unit 631 and a color corrector 632. The decision-making unit 631 is for choosing the correction indicator (sa) from a group of values. In this embodiment, the group includes the maximum extreme value threshold $TH_{max}$, the minimum extreme value threshold $TH_{min}$, the retarding saturation signal, and the saturation setting. Specifically, the decision-making unit 631 is configured for choosing a smallest one of the maximum extreme value threshold $TH_{max}$ the minimum extreme value threshold $TH_{min}$ and the retarding saturation signal as the correction indicator (sa) if the saturation setting is greater than 0, and for choosing the saturation setting as the correction indicator (sa) if the saturation setting is not greater than 0. When the saturation setting is not greater than 0, the maximum and minimum extreme value thresholds $TH_{max}$, $TH_{min}$ are not considered for the correction indicator (sa) because both of the thresholds are not smaller than 0 and are greater than the saturation setting, and the retarding saturation signal is not considered for the saturation setting while the correction indicator (sa) increases negatively because the saturation degree varies slowly such that retarding the variation rate is unnecessary. The color corrector 632 is for performing the linear color correction processing on the three color components r, g, b of the pixel using the correction indicator (sa). The color correction processing is performed according to the following equations:

$$R=r+(r-I)\times sa,$$

$$G=g+(g-I)\times sa, \text{ and}$$

$$B=b+(b-I)\times sa,$$

in which R, G, and B represent corrected color components, I represents the intensity value, and sa represents the correction indicator.

Referring to FIG. 3, the color corrector 632 for implementing the color correction processing includes: a subtractor SUB for subtracting the intensity value I of the pixel from the value of each of the three color components of the pixel, thereby obtaining three difference values that correspond to the three color components r, g, b, respectively; a multiplier MUL for multiplying each of the difference values by the correction indicator (sa) to obtain three product values that correspond to the three color components r, g, b, respectively; and an adder ADD for adding each of the product values and the value of a respective one of the three color components, thereby obtaining values of the corrected color components R, G, B of the pixel.

Figure 2:
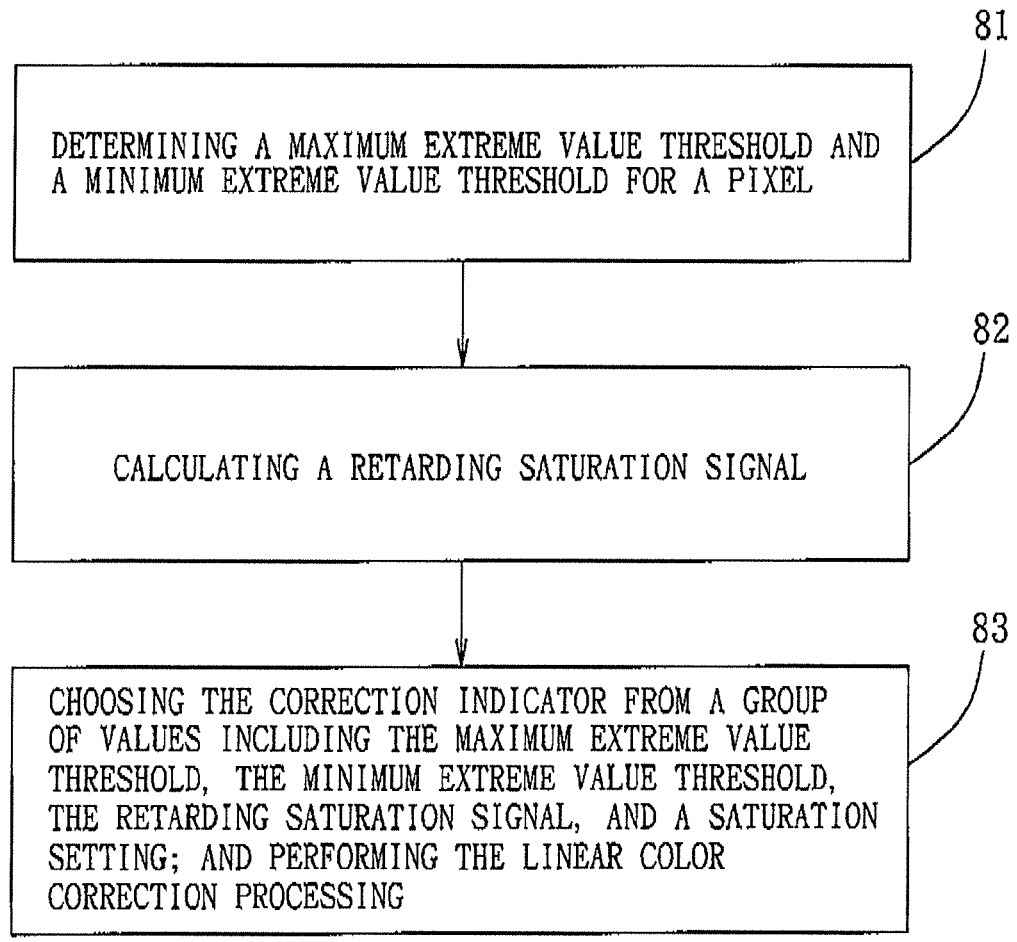
FIG. 2 is a flowchart illustrating an embodiment of the saturation adjusting method of the present invention.

Referring to FIG. 2, a preferred embodiment of the saturation adjusting method of the present invention is illustrated. The saturation adjusting method is for processing a pixel of a RGB color model, and the pixel has three color components r, g, b. Each of the three color components r, g, b has a value falling within a range defined by upper and lower extreme values, i.e., 255 to 0. The saturation adjusting method includes:

81) determining a maximum extreme value threshold $TH_{max}$ and a minimum extreme value threshold $TH_{min}$ for ensuring that the values of the color components of the pixel after undergoing linear color correction processing based on a correction indicator (sa) fall within the range defined by the upper and lower extreme values, 255 and 0, wherein, step 81) includes:

811) calculating an intensity value I of the pixel based on the values of the three color components r, g, b thereof, 812) choosing one of the color components having a maximum value $P_{max}$ and one of the color components having a minimum value $P_{min}$ from the three color components r, g, b of the pixel, 813) determining the maximum extreme value threshold $TH_{max}$ from the intensity value I obtained in sub-step 811) and the color component with the maximum value $F_{max}$ chosen in sub-step 812) such that the values of the color components of the pixel after undergoing the linear color correction processing do not exceed the upper extreme value of 255, and 814) determining the minimum extreme value threshold $TH_{min}$ from the intensity value I obtained in sub-step 811) and the color component with the minimum value $P_{min}$ chosen in sub-step 812) such that the values of the color components of the pixel after undergoing the linear color correction processing are not smaller than the lower extreme value of 0;

82) calculating a retarding saturation signal, which is capable of retarding a variation rate of a saturation degree of the pixel during the color correction processing, for the pixel based on an external saturation setting, wherein step 82) includes:

821) calculating a color tone signal indicative of the saturation degree of the pixel according to the values of the three color components r, g, b of the pixel, and 822) multiplying the color tone signal by the saturation setting to obtain the retarding saturation signal; and 83) choosing the correction indicator (sa) from a group of values based on the saturation setting, the group including the maximum extreme value threshold $TH_{max}$, the minimum extreme value threshold $TH_{min}$, the retarding saturation signal, and the saturation setting; and performing the linear color correction processing on the three color components r, g, b of the pixel using the correction indicator (sa), wherein step 83) includes:

831) choosing a smallest one of the maximum extreme value threshold $TH_{max}$, the minimum extreme value threshold $TH_{min}$, and the retarding saturation signal as the correction indicator (sa) if the saturation setting is greater than 0; and choosing the saturation setting as the correction indicator (sa) if the saturation setting is not greater than 0, and 832) performing the color correction processing on the three color components r, g, b to obtain values of the corrected color components of the pixel.

A standard 24-color card is adopted as a standard for analyzing performances of the present invention and the conventional technique objectively based on the saturation and intensity in the HSI color model. Since the RGB color model and the HSI color model have the nonlinear transformation relation, a hue degree of the image may deviate slightly when the saturation degree of the pixel of the RGB color model is adjusted linearly and the intensity value is maintained in the present invention.

For example, in Table 1, a scaling factor (sy)=0.3 adopted by the conventional technique based on a YCbCr color model, and the saturation setting (cmd)=0.8 adopted by the present disclosure based on the RGB color model are illustrated in expectation that the saturation degree in the HSI color model increases 0.17 times. In this situation, the hue degree deviates both in the conventional technique and the present disclosure.

TABLE 1

| Saturation degree increment multiple | Adjusting technique | Scaling factor (sy)/ saturation setting (cmd) | Average error in hue degree $[0, \pi]$ | Maximum error in hue degree $[0, \pi]$ |
|---|---|---|---|---|
| 0.17 | Conventional technique | sy = 0.3 | 0.0081 | 0.0296 |
|  | Present disclosure | cmd = 0.8 | 0.0053 | 0.0147 |
| 0.25 | Conventional technique | sy = 0.49 | 0.0131 | 0.0467 |
|  | Present disclosure | cmd = 1.4 | 0.0037 | 0.0132 |
| 0.32 | Conventional technique | sy = 0.7 | 0.0139 | 0.0608 |
|  | Present disclosure | cmd = 2.0 | 0.0050 | 0.0116 |
| 0.40 | Conventional technique | sy = 0.95 | 0.0198 | 0.0744 |
|  | Present disclosure | cmd = 3.0 | 0.0029 | 0.0088 |

However, compared with the conventional technique, errors in hue degree are much smaller in the present disclosure with the same saturation degree increment multiple. Moreover, the errors in hue degree may not increase with the saturation degree increment multiples. Therefore, it is evident from Table 1 that the present disclosure adopting the simple linear color correction processing may adjust the saturation degree of the pixel and control deviation in the hue degree.

In summary, the embodiments of the saturation adjusting apparatus 600, 700 and method thereof may determine the maximum and minimum extreme value thresholds $TH_{max}$, $TH_{min}$ to constrain the correction indicator (sa) for protection of image details. Furthermore, the retarding saturation signal is calculated according to the color tone signal to retard the variation rate of the saturation degree during the color correction processing for achieving the expected saturation degree when the saturation setting is greater than 0. Since the aforementioned adjustments are all based on linear mathematical operations, the disclosure incurs relatively low circuit costs.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A saturation adjusting apparatus for processing a pixel of a RGB color model, the pixel having three color components each having a value falling within a range defined by upper and lower extreme values, the saturation adjusting apparatus comprising:
- an extreme value controller for determining a maximum extreme value threshold and a minimum extreme value threshold for ensuring that the values of the color components of the pixel after undergoing linear color correction processing based on a correction indicator (sa) fall within the range defined by the upper and lower extreme values; and
- a component adjuster including
  - a decision-making unit for choosing the correction indicator (sa) from a group of values, the group including the maximum extreme value threshold, the minimum extreme value threshold, a saturation setting, and a retarding saturation signal for limiting the correction factor (sa), wherein the correction indicator (sa) is chosen based on the saturation setting, and
  - a color corrector for performing linear color correction processing on the three color components of the pixel using the correction indicator (sa).

2. The saturation adjusting apparatus as claimed in claim 1, wherein the extreme value controller includes:
- an intensity value calculator for calculating an intensity value of the pixel based on the values of the three color components thereof;
- a component comparator for choosing one of the color components having a maximum value and one of the color components having a minimum value from the three color components of the pixel;
- a maximum threshold generator for determining the maximum extreme value threshold from the intensity value obtained by the intensity value calculator and the color component with the maximum value chosen by the component comparator such that the values of the color components of the pixel after undergoing linear color correction processing do not exceed the upper extreme value; and
- a minimum threshold generator for determining the minimum extreme value threshold from the intensity value obtained by the intensity value calculator and the color component with the minimum value chosen by the component comparator such that the values of the color components of the pixel after undergoing linear color correction processing are not smaller than the lower extreme value.

3. The saturation adjusting apparatus as claimed in claim 1, further comprising a saturation controller, which includes:
- a color tone calculator for calculating a color tone signal indicative of a saturation degree of the pixel according to the values of the three color components of the pixel; and
- a multiplier for multiplying the color tone signal by the saturation setting to obtain the retarding saturation signal.

4. The saturation adjusting apparatus as claimed in claim 3, wherein the color tone calculator includes:
- a divider for dividing a minimum value of the color components of the pixel by an intensity value of the pixel to obtain a quotient result; and
- a subtractor for subtracting the quotient result from the divider from a predetermined number to obtain the color tone signal.

5. The saturation adjusting apparatus as claimed in claim 3, wherein the color tone calculator includes:
- a subtractor for calculating a difference between a maximum value of the color components of the pixel and a minimum value of the color components of the pixel to obtain a difference result;
- a shifter for obtaining a quotient resulting from division of the difference result from the subtractor by a predetermined value; and
- a limiter for setting the color tone signal to be equal to a preset number if the quotient from the shifter is greater than a threshold, and to be equal to the quotient if the quotient from the shifter is not greater than the threshold.

6. The saturation adjusting apparatus as claimed in claim 3, wherein the decision-making unit is configured for choosing a smallest one of the maximum extreme value threshold, the minimum extreme value threshold and the retarding saturation signal as the correction indicator (sa) if the saturation setting is greater than 0, and for choosing the saturation setting as the correction indicator (sa) if the saturation setting is not greater than 0.

7. The saturation adjusting apparatus as claimed in claim 1, wherein the color corrector includes:
- a subtractor for subtracting an intensity value of the pixel from the value of each of the three color components of the pixel, thereby obtaining three difference values that correspond to the three color components, respectively;
- a multiplier for multiplying each of the difference values by the correction indicator (sa) to obtain three product values that correspond to the three color components, respectively; and
- an adder for adding each of the product values and the value of a respective one of the three color components, thereby obtaining values of corrected color components of the pixel.

8. A saturation adjusting method for processing a pixel of a RGB color model, the pixel having three color components each having a value falling within a range defined by upper and lower extreme values, the saturation adjusting method comprising:
- determining a maximum extreme value threshold and a minimum extreme value threshold for ensuring that the values of the color components of the pixel after undergoing linear color correction processing based on a correction indicator (sa) fall within the range defined by the upper and lower extreme values;
- choosing the correction indicator (sa) from a group of values, the group including the maximum extreme value threshold, the minimum extreme value threshold, a saturation setting, and a retarding saturation signal for limiting the correction factor (sa), wherein the correction indicator (sa) is chosen based on the saturation setting; and
- performing linear color correction processing on the three color components of the pixel using the correction indicator (sa).

9. The saturation adjusting method as claimed in claim 8, wherein the step of determining a maximum extreme value threshold and a minimum extreme value threshold includes:
- calculating an intensity value of the pixel based on the values of the three color components thereof;
- choosing one of the color components having a maximum value and one of the color components having a minimum value from the three color components of the pixel;

determining the maximum extreme value threshold from the intensity value obtained in the step of calculating an intensity value of the pixel, and the color component with the maximum value chosen in the step of choosing one of the color components having a maximum value and one of the color components having a minimum value, such that the values of the color components of the pixel after undergoing linear color correction processing do not exceed the upper extreme value; and determining the minimum extreme value threshold from the intensity value obtained in the step of calculating an intensity value of the pixel, and the color component with the minimum value chosen in the step of choosing one of the color components having a maximum value and one of the color components having a minimum value, such that the values of the color components of the pixel after undergoing linear color correction processing are not smaller than the lower extreme value.

10. The saturation adjusting method as claimed in claim 8, wherein the saturation adjusting method further comprising:
calculating a color tone signal indicative of a saturation degree of the pixel according to the values of the three color components of the pixel; and
multiplying the color tone signal by the saturation setting to obtain the retarding saturation signal.

11. The saturation adjusting method as claimed in claim 10, wherein the step of calculating a color tone signal indicative of a saturation degree of the pixel includes:
dividing a minimum value of the color components of the pixel by an intensity value of the pixel to obtain a quotient result; and
subtracting the quotient result from a predetermined number to obtain the color tone signal.

12. The saturation adjusting method as claimed in claim 10, wherein the step of calculating a color tone signal indicative of a saturation degree of the pixel includes:
calculating a difference between a maximum value of the color components of the pixel and a minimum value of the color components of the pixel to obtain a difference result;
dividing the difference result by a predetermined value to obtain a quotient; and
setting the color tone signal to be equal to a preset number if the quotient is greater than a threshold, and to be equal to the quotient if the quotient is not greater than the threshold.

13. The saturation adjusting method as claimed in claim 10, wherein the step of choosing the correction indicator (sa) from a group of values includes:
choosing a smallest one of the maximum extreme value threshold, the minimum extreme value threshold and the retarding saturation signal as the correction indicator (sa) if the saturation setting is greater than 0; and
choosing the saturation setting as the correction indicator (sa) if the saturation setting is not greater than 0.

14. The saturation adjusting method as claimed in claim 8, wherein the step of performing linear color correction processing includes:
subtracting an intensity value of the pixel from the value of each of the three color components of the pixel, thereby obtaining three difference values that correspond to the three color components, respectively;
multiplying each of the difference values by the correction indicator (sa) to obtain three product values that correspond to the three color components, respectively; and
adding each of the product values and the value of a respective one of the three color components, thereby obtaining values of corrected color components of the pixel.

15. A saturation adjusting method for processing a pixel of a RGB color model, the pixel having three color components each having a value falling within a range defined by upper and lower extreme values, the saturation adjusting method comprising:
choosing a maximum color component value and a minimum color component value from the three color components of the pixel;
calculating an intensity value of the pixel based on the values of the three color components;
determining a maximum extreme value threshold based on the intensity value, the maximum color component value, and the upper extreme value;
determining a minimum extreme value threshold based on the intensity value, the minimum color component value, and the lower extreme value;
choosing the correction indicator (sa) from a group of values including the maximum extreme value threshold, the minimum extreme value threshold, and a saturation setting; and
performing linear color correction processing on the three color components of the pixel using the correction indicator (sa), wherein determining the maximum extreme value threshold comprises determining the maximum extreme value threshold from the intensity value and the maximum color component value such that the values of the color components of the pixel after undergoing linear color correction processing do not exceed the upper extreme value.

16. The method of claim 15, wherein determining the minimum extreme value threshold comprises determining the minimum extreme value threshold from the intensity value and the minimum color component value such that the values of the color components of the pixel after undergoing linear color correction processing are not less than the lower extreme value.

17. The method of claim 15, wherein the group from which the correction indicator (sa) is chosen further includes a retarding saturation signal, and wherein the method further comprises:
calculating a color tone signal indicative of a saturation degree of the pixel according to the values of the three color components of the pixel; and
multiplying the color tone signal by the saturation setting to obtain the retarding saturation signal.

18. The method of claim 17, wherein calculating the color tone signal indicative of a saturation degree of the pixel comprises:
dividing a minimum value of the color components of the pixel by the intensity value of the pixel to obtain a quotient result; and
subtracting the quotient result from a predetermined number to obtain the color tone signal.

19. The method of claim 17, wherein calculating the color tone signal indicative of a saturation degree of the pixel comprises:
calculating a difference between the maximum value of the color components of the pixel and the minimum value of the color components of the pixel to obtain a difference result;
dividing the difference result by a predetermined value to obtain a quotient; and setting the color tone signal to either a preset number or the quotient based on a threshold.

* * * * *